ELECTRONIC TRANSMISSION LINE

Filed Jan. 2, 1962 2 Sheets-Sheet 1

GLEN A. MATHEWS,
ANDREW E. FLANDERS,
INVENTORS.

BY

ATTORNEYS

ELECTRONIC TRANSMISSION LINE

Filed Jan. 2, 1962 2 Sheets-Sheet 2

GLEN A. MATHEWS,
ANDREW E. FLANDERS,
INVENTORS.

BY Walter J. Jason
Bernard D. Brown

ATTORNEYS

United States Patent Office 3,150,288
Patented Sept. 22, 1964

3,150,288

ELECTRONIC TRANSMISSION LINE

Andrew E. Flanders and Glen A. Mathews, Pomona, Calif., assignors to General Dynamics Corporation, San Diego, Calif., a corporation of Delaware Filed Jan. 2, 1962, Ser. No. 163,584
7 Claims. (Cl. 317—101)

The present invention relates generally to electronic transmission lines for interconnecting electrical components; more particularly, the invention relates to electronic transmission lines for interconnecting components in respective sub-assemblies or modules.

Heretofore, the electrical interconnection of components in separate sub-assemblies or modules has involved the use of special devices for mechanical connection and in order to accommodate the different frequency ranges encountered in different sub-assemblies. Such devices have included electronic harnesses, coaxial connectors, special cables, mechanical connections and various transition arrangements. Such electrical interconnection has involved soldering, with its well-known problems and shortcomings such as coldflow, lack of reliability, and relatively low resistance to adverse environmental conditions such as vibration and shock.

The present invention provides improved interconnection of electrical components in respective sub-assemblies or modules, and provides for the interconnection of cooperating electrical functions represented by separate modules or encapsulated assemblies. The invention makes possible the use of similar connector members to connect various components throughout various sub-assemblies or modules and throughout the different frequency ranges or spectra encountered in different sub-assemblies. Preferred forms of connector members according to the invention are formed from integral metal strips by bending. Each connector member has a contact section which extends along the surface of a module or of a header board forming a part of a module. A tab section of the connector member extends perpendicularly from an end of the contact section into the module and into electrical contact with a lead wire of at least one component. The tab section preferably is force-fitted in an opening in the header board. Each connector member preferably has a retaining section extending perpendicularly from the end of the contact section opposite from the tab section. The retaining section is force-fitted in an opening in the header board for securement. The contact sections of different connector members on respective modules are connected either by an interconnecting strip element or by an interconnecting section of a male connector member. The interconnecting element or section extends between modules and provides mechanical and electrical connection.

The invention thus obviates the use of various devices for electrical connection. It makes possible an all-welded electronic system and substantially eliminates the problems associated with soldered connections. Greatly improved reliability is provided.

It is, therefore, an object of the present invention to provide a transmission line system for the electrical interconnection of the components, which makes possible an all-welded electronic system.

An object of the invention is the provision of a transmission line system of improved reliability and improved resistance to adverse environmental conditions, such as shock and vibration.

It is an object of this invention to provide an electronic transmission line system which substantially eliminates problems associated with soldered connections.

An object of the present invention is to provide an electronic transmission line system according to the foregoing objects wherein welded connections may be repeatedly and conveniently disconnected and rewelded.

An object of the invention is the provision of an electronic transmission line system which obviates the use of specialized mechanical connections, special transition devices and cables.

An object of the invention is the provision of an electronic transmission line system capable of accommodating frequencies ranging from D.C. through the microwave range, thereby permitting the use of similar connectors throughout a system of sub-assemblies.

It is an object of this invention to provide an electronic transmission line system which permits a high density of interconnections.

It is an object of this invention to provide an electronic transmission line system which facilitates servicing and trouble-shooting by positioning connectors conveniently on aligned surfaces of a plurality of modules or sub-assemblies.

An object of the present invention is to provide an electronic transmission line system which is readily adapted for use with conventional microwave strip line circuitry.

Other objects, features and advantages of the present invention will become apparent to those versed in the art from a consideration of the following description, the appended claims and the accompanying drawings, wherein:

Figure 1:
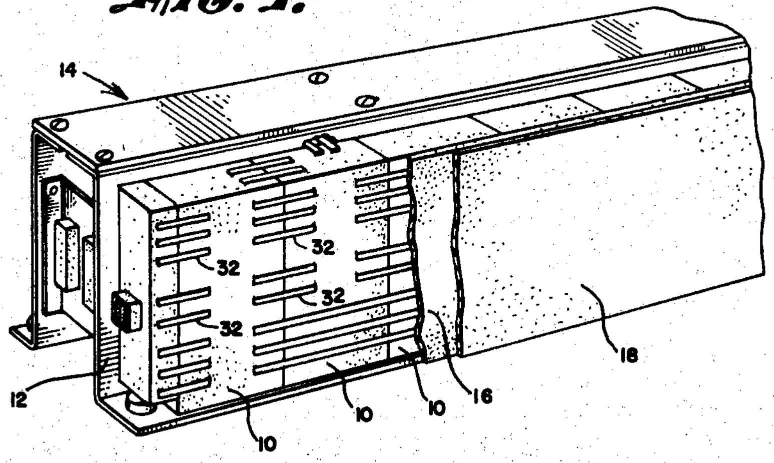
FIGURE 1 is a perspective view showing modules of encapsulated components secured to an electronic chassis and interconnected by an electronic transmission line system of the present invention.

Referring to the drawings, a preferred embodiment of the electronic transmission line assembly of the present invention is shown in FIGURES 1, 2, 3 and 5. A plurality of modules 10 are secured to a panel 12 of an electronic chassis 14, each module being secured to the panel by appropriate fastening means, such as screws. Each module contains a sub-assembly of electronic components. The outer faces of the modules are covered by a common dielectric layer 16 which in turn is covered by a metallic electrostatic shielding member 18, as shown.

Figures 2, 3:
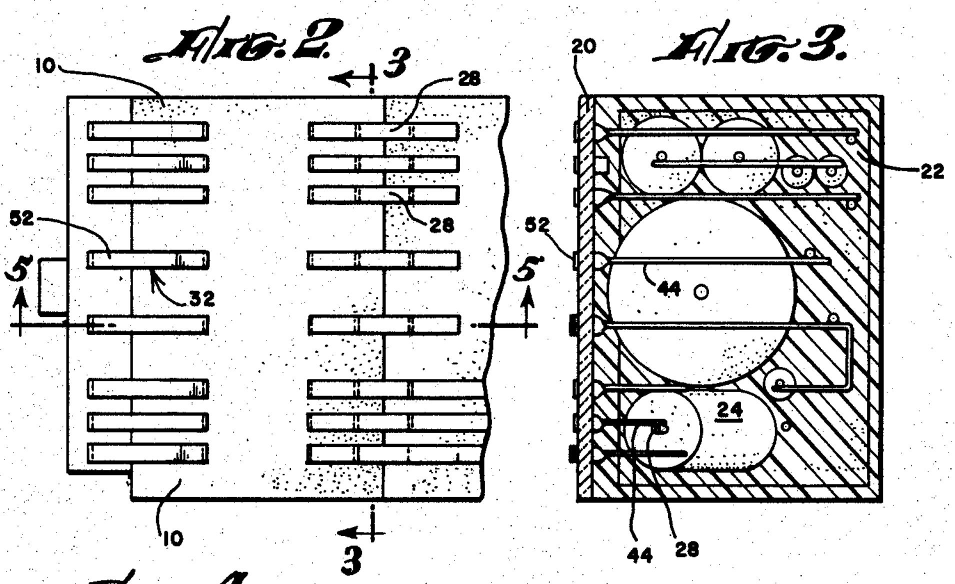
FIGURE 2 is a partial elevational view of the modules of FIGURE 1, showing an arrangement of connector members according to the invention.
FIGURE 3 is a sectional view taken at line 3—3 of FIGURE 2.
Figure 4:
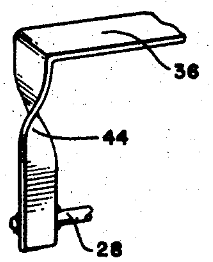
FIGURE 4 is a partial perspective view of a connector member according to the invention.
Figure 5:
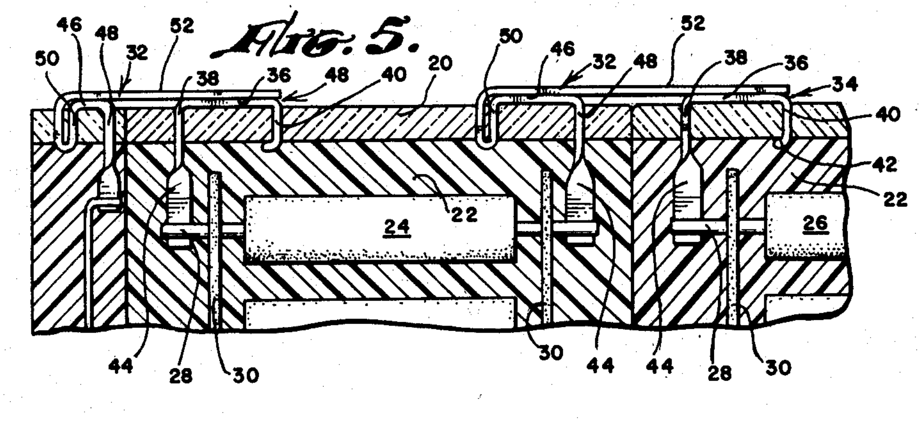
FIGURE 5 is a partial sectional view taken at line 5—5 of FIGURE 2, showing the interconnection of electrical components in different modules.

Referring to FIGURES 2, 3 and 5, each module 10 includes a header board 20, a body 22 of encapsulating or potting compound, such as epoxy, and a plurality of encapsulated electronic components, such as those indicated by the reference numerals 24, 26. The electronic components may preferably have their lead wires or busses 28 engaged in reinforcing structural elements 30, as shown.

Male connector members 32 and female connector members 34 are utilized in the embodiment illustrated in FIGURES 3 and 5. Each female connector member 34, as best shown in FIGURE 5, is integrally formed from a single strip of metal by bending. The female connector member 34 includes a first or contact section 36, a second or tab section 38 extending perpendicularly from an end of the contact section, and a third or retaining section 40 extending perpendicularly from the opposite end of the contact section. The retaining section 40 extends through an opening in the header board and is force-fitted therein for securement of the connector member. The retaining section has its end portion bent, as indicated at 42, for the purpose of retaining the connector member on the header board. The tab section 38 extends through an appropriate opening in the header board in which it is force-fitted for securement, and extends into contact with the lead wire 28 of the electrical component 26. The tab section 38 is twisted as indicated at 44, preferably 90°, to prevent disengagement of the connector member from the header board and to provide a substantially plane, surface oriented to facilitate electrical contact with and welding to the lead wire 28. The tab section 38 has an appropriate length for extending an appropriate distance into the module to engage the lead wire or bus of the electrical component to which it is welded. Welding is preferably accomplished by spot-welding techniques.

Like the female connector member, the male connector member is formed integrally from a single metal strip by bending. The male connector member 32 includes a first or contact section 46 and a tab section 48, which are generally similar to the corresponding sections of the female connector member, the contacting section being twisted in the same manner. A retaining section 50 of double thickness is formed by bending and extends perpendicularly from an end of the contact section 46, as shown, the retaining section being force-fitted in an appropriate opening in the header board. The male connector member 32 also has a fourth elongated interconnecting section 52, which extends perpendicularly from the retaining section 50, overlying the contact section 46. The interconnecting section extends beyond the contact section and beyond the edge of the module for the purpose of engaging the contact section of a connector member on an adjacent module, in the manner illustrated.

Figure 6:
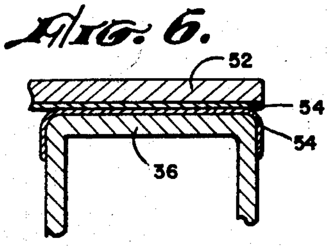
FIGURE 6 is an enlarged fragmentary view of sections of connector members, showing the plating thereof to facilitate surface welding.

FIGURE 6 indicates the manner in which the surface of the contact section of a female connector member 34 and the surface of an interconnecting section 52 of a male element are preferably coated with layers 54 of a material such as gold, which is fusable at an appropriate temperature to facilitate securement of the connector members by welding. It has been found in practice that the fabrication of the connector members of a material such as nickel and the coating or plating of the surfaces thereof with a material such as gold, facilitates the effective and efficient surface welding of the connector members. The surface welding is preferably effected by electrical resistance welding by the application of electrodes to the interconnecting section of the male connector member.

Figure 7:
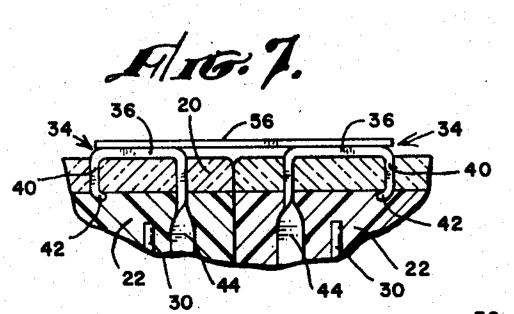
FIGURE 7 is a partial view similar to the view of FIGURE 5, illustrating a modified form of the invention wherein an interconnecting strip is utilized.

In FIGURE 7 there is illustrated an embodiment of the invention wherein two female connector members 34 mounted in respective modules are interconnected by an interconnecting element or jumper ribbon 56, which is secured, as by surface welding, to the contact sections 36 of the connector members. It will be observed, this embodiment eliminates the use of male connector members.

Figure 8:
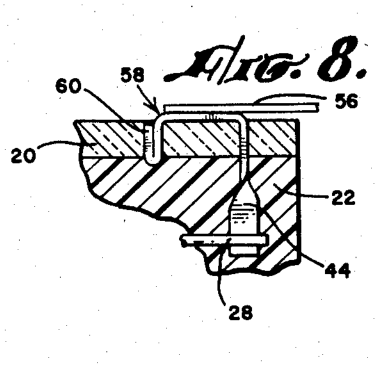
FIGURE 8 is a partial view, similar to the view of FIGURE 5, showing a modified form of connector member.

FIGURE 8 illustrates a modified form of female connector member 58, which has a modified retaining section 60 formed by bending the metal strip upon itself.

Figure 9:
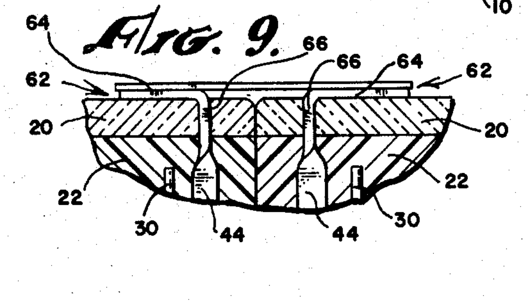
FIGURE 9 is a partial view, similar to the view of FIGURE 7, illustrating another modified form of connector member.

FIGURE 9 illustrates a modified form of female connector member 62 which has only a contact section 64 and a tab section 66, the retaining section being eliminated. Sufficient retention of the connector member on the header board may be provided by the force-fitting of the tab section 66 in the header board.

Figure 10:
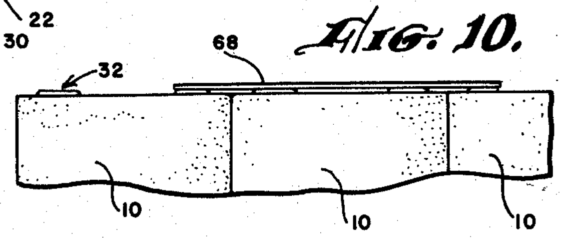
FIGURE 10 is a partial elevational view illustrating the interconnection of connector members on three modules by an interconnecting strip element.

FIGURE 10 indicates the general manner in which connector members in three modules may be interconnected by a single strip element 68.

Prior to the fabrication of modules and their interconnection by the transmission line assemblies, connector members, header boards and electrical components are provided with cooperating dimensions and features. For each module a header board of appropriate configuration is provided with appropriately positioned openings. These openings are preferably rectangular to better accommodate strip elements of rectangular cross-section, but they may be circular for convenience of fabrication. The tab sections of the connector members are designed with appropriate respective lengths so that they extend appropriate distances into the modules to engage their respective electrical components.

In the fabrication of a module, the tab and/or retaining sections of each connector member are inserted or force-fitted through the respective pairs of openings provided. The contact section is positoned against the surface of the header board. The end portions of the retaining sections of female connectors are bent over adjacent to the inner surface of the header board for securement of the connector members. The tab sections of both male and female connector members are twisted, both for securement to the header board and to facilitate electrical contact with and welding to the lead wires or busses of the electrical components.

An appropriate material such as epoxy may then be applied to the inner surface of the header board to seal the openings through which the connector members extend. This sealing is, of course, more important where circular openings are used with connector members of rectangular cross-section.

An electronic sub-assembly is provided which has been previously assembled with some electrical connections completed, with structural strength provided by appropriate positioning and engagement of structural elements relative to electrical components. The tab sections of respective connector members are individually welded to the lead wires or busses of respective electrical components, as by spot welding.

Encapsulating or potting material, such as epoxy compound is then molded with the assembly hereinbefore described, in conventional manner, to encapsulate the components and to provide a module of appropriate configuration to be assembled with similar modules to provide an overall electrical assembly comprising the subassemblies represented by the individual modules.

From the foregoing description and the drawings it will be understood, that components in different modules or sub-assemblies, and different electronic functions represented by respective units or modules, may be interconnected by electronic transmission lines according to the present invention, wherein similar connector members may be utilized throughout, and wherein these connector members will accommodate various frequency ranges from D.C. through the microwave range. The invention thus obviates the need for special mechanical connections, devices or cables. An all-welded system is facilitated, involving no soldering. A high degree of reliability is provided, and the system is resistant to adverse environmental conditions. Transmission lines of the invention are readily serviceable because of the convenient positioning of connector members on aligned surfaces. Connections may be readily disconnected and rewelded.

Although specific embodiments of the present invention have been described and illustrated in detail, it is to be clearly understood that the same are by way of illustration and example only; it is to be understood that the invention is not limited thereto, as many variations will be readily apparent to those versed in the art and the invention is to be given its broadest possible interpretation within the terms of the appended claims.

The inventors claim:

1. An electronic transmission line for connecting an encapsulated electrical component with a circuit, said electronic transmission line comprising a connector member on a body of encapsulating material containing the electrical component, the body having a nearly flat continuous surface portion, a contact section of the connector member extending along and nearly flush with the said surface portion of said body of encapsulating material, a tab section of the connector member extending from the contact section into the encapsulating material to connect with the electrical component, and strip interconnecting means coated with metal fusible at such a temperature as to facilitate its surface welding, said strip interconnecting means weldably engaging said contact section and extending therefrom to connect the electrical component in a circuit.

2. An electronic transmission line for interconnecting electrical components in respective modules, comprising a connector member on each of two modules, a contact section of each connector member extending along and nearly flush with a substantially flat and continuous surface portion of its respective module, a tab section of each connector member extending from the contact section into the module to connect with an electrical component therewithin, and an interconnecting strip element overlying and interconnecting said contact sections, said contact section and said strip element being coated with metal fusible at such a temperature as to facilitate surface welding of the contact section to the interconnecting element, whereby the electrical components in respective modules are interconnected.

3. An electronic transmission line assembly for interconnecting electrical components in respective modules of encapsulated components, said transmission line assembly comprising header boards of substantially flat and continuous surface configuration constituting surfaces of respective modules, connector members on each of two modules, contact sections of each connector member disposed upon said header board surfaces nearly flush therewith, said contact sections on each header board being arranged for circuit joinder in a plurality of spaced apart substantially parallel rows, tab sections of each connector member extending through said header board into the module for electrical connection with said electrical components, and interconnecting strip elements surface welded to and extending between the contact sections of connector members respectively located upon either of the two modules to electrically interconnect said electrical components and to mechanically link said modules, said interconnecting strip elements being coated with a metal fusible at such a temperature as to facilitate their surface welding at the contact sections.

4. The electronic transmission line assembly of claim 3, wherein the said electrical components are disposed in side by side relationship within said modules and said parallel rows of contact sections are laterally displaced from and positioned opposite the ends of the electrical components.

5. An electronic transmission line for connecting an encapsulated electrical component with a circuit, said electronic transmission line comprising a connector member on a body of encapsulating material containing the electrical component, the body having a nearly flat continous surface portion, a contact section of the connector member extending along and nearly flush with the said surface portion of said body of encapsulating material, a tab section of the connector member extending from the contact section into the encapsulating material to connect with the electrical component, and strip interconnecting means surface welded to said contact section and extending therefrom to connect the electrical component in a circuit, said strip interconnecting means being coated with metal fusible at such a temperature as to facilitate said surface welding of the strip interconnecting means and the contact section.

6. An electronic transmission line assembly for interconnecting electrical components in respective modules of encapsulated components, said transmission line assembly comprising header boards each constituting a substantially flat continuous surface of respective modules, a connector member on each of two modules, a contact section of each connector member extending along said module surface, a tab section of each connector member extending from the contact section through an opening in the header board to connect with an electrical component within the module, said tab section fitting closely in said header board opening for securement, and an interconnecting strip element surface welded to and interconnecting said contact sections to electrically interconnect said electrical components and to mechanically link said modules, said strip element being coated with a metal fusible at such a temperature as to facilitate said surface welding of the strip element to said contact section.

7. An electronic transmission line assembly for interconnecting elecrtical components in respective modules of encapsulated components, said transmission line assembly comprising header boards of substantially flat and continuous surface configuration constituting surface portions of respective modules, connector members on each of two modules, contact sections of each connector member disposed upon said header board surfaces nearly flush therewith, tab sections of each connector member extending through said header board into the module for electrical connection with said electrical components, and interconnecting strip elements surface welded to and extending between the contact sections of connector members respectively located upon either of the two modules to electrically interconnect said electrical components and to mechanically link said modules, said interconnecting strip elements being coated with a metal fusible at such a temperature as to facilitate their surface welding at the contact sections.

References Cited in the file of this patent

UNITED STATES PATENTS

| | | |
|---|---|---|
| 2,911,572 | Francis et al. | Nov. 3, 1959 |
| 3,098,950 | Geshner | July 23, 1963 |

OTHER REFERENCES

Danko, Doxey and McNaul: The Micro-Module: A Logical Approach to Microminaturization, 1959 (pp. 897) publication.